March 24, 1953 A. E. KROWS 2,632,361
FILM THREADING MEANS FOR PROJECTOR APPARATUS
Filed Feb. 21, 1950 3 Sheets-Sheet 1
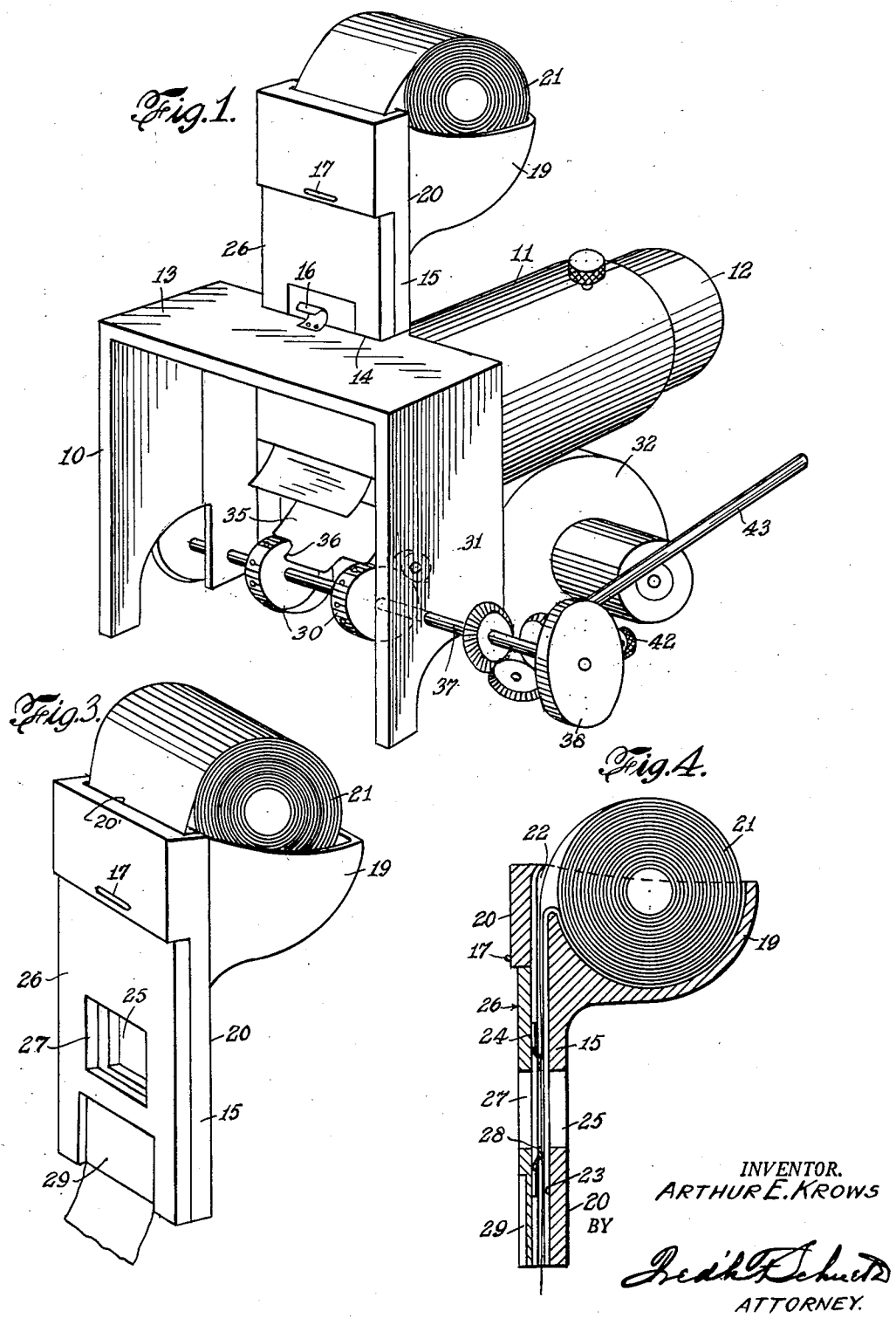
INVENTOR.
ARTHUR E. KROWS
BY
ATTORNEY.

March 24, 1953 A. E. KROWS 2,632,361
FILM THREADING MEANS FOR PROJECTOR APPARATUS
Filed Feb. 21, 1950 3 Sheets-Sheet 2
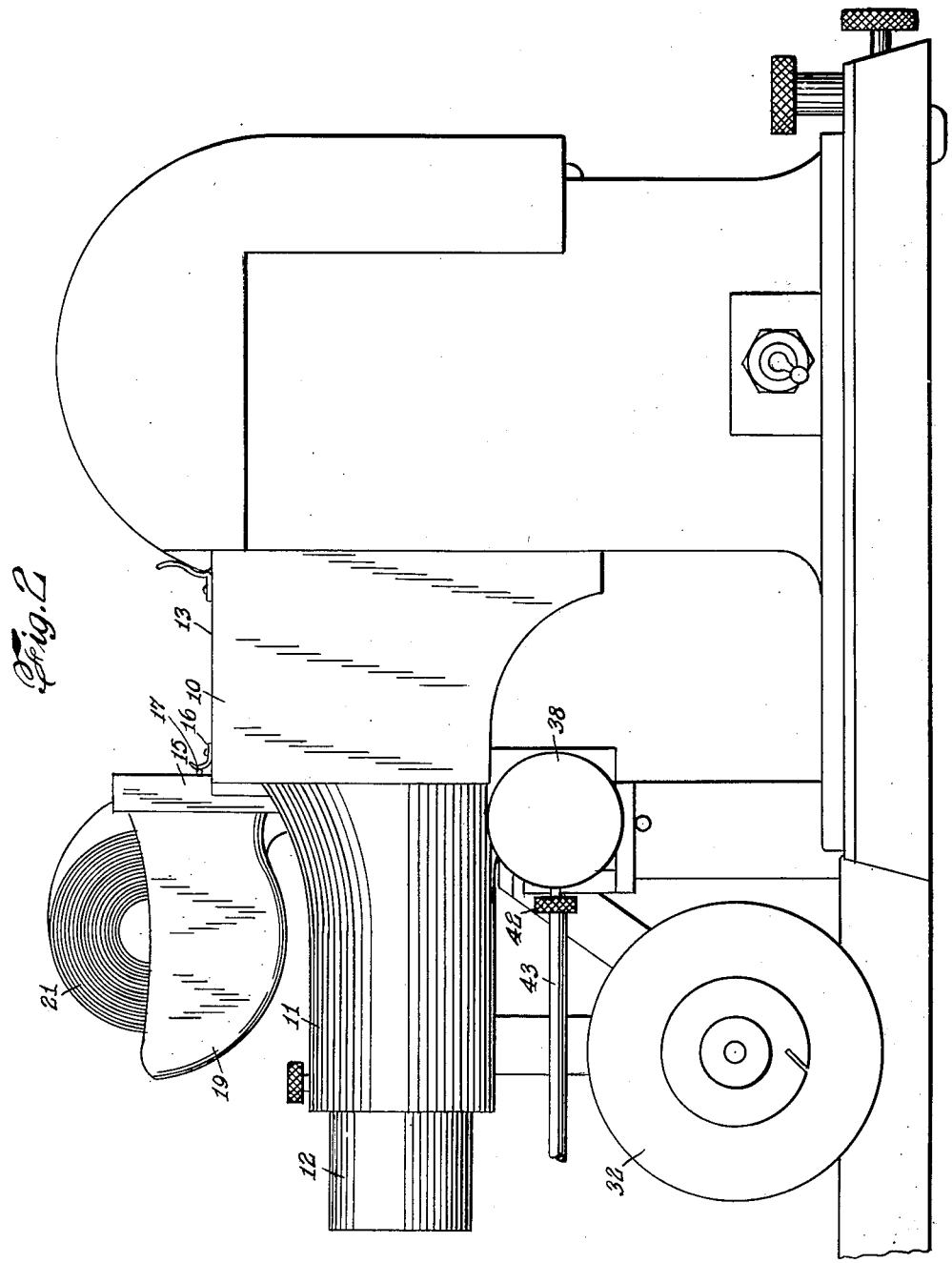
INVENTOR.
ARTHUR E. KROWS
BY
ATTORNEY.

March 24, 1953 A. E. KROWS 2,632,361
FILM THREADING MEANS FOR PROJECTOR APPARATUS
Filed Feb. 21, 1950 3 Sheets-Sheet 3
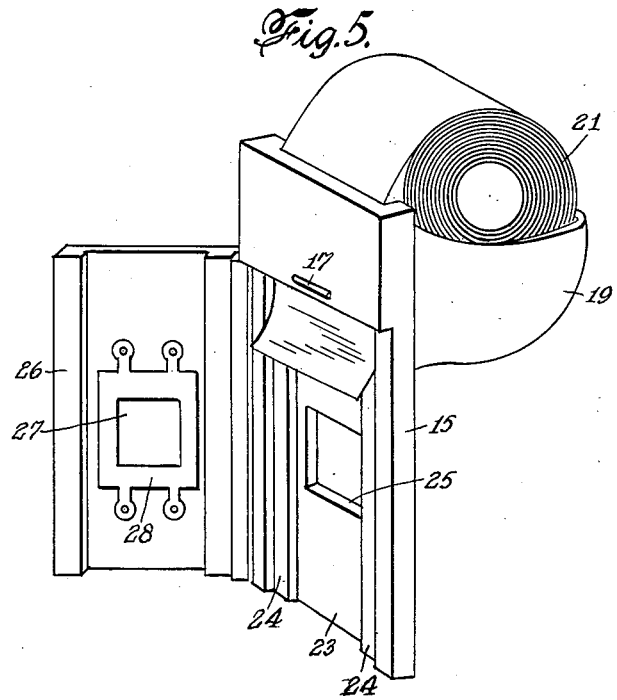
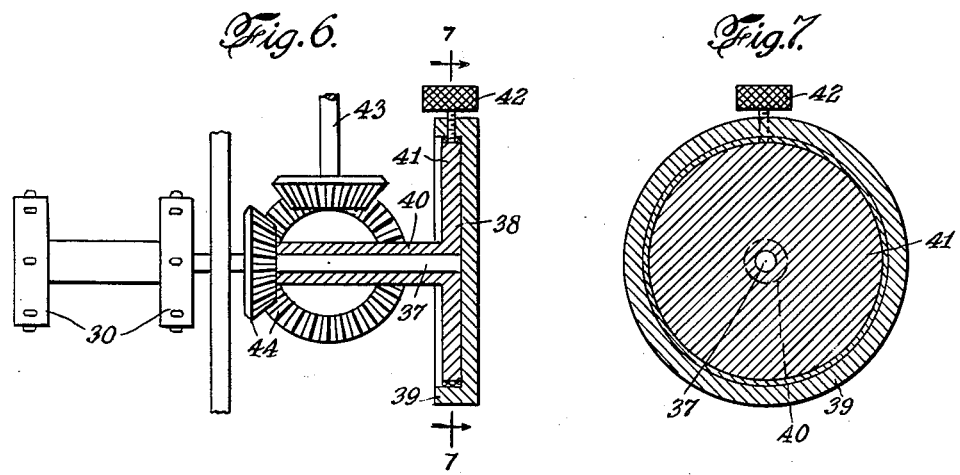
INVENTOR.
ARTHUR E. KROWS
BY
ATTORNEY.

Patented Mar. 24, 1953

2,632,361

UNITED STATES PATENT OFFICE 2,632,361

FILM THREADING MEANS FOR PROJECTOR APPARATUS

Arthur E. Krows, Hastings on Hudson, N. Y.

Application February 21, 1950, Serial No. 145,396

3 Claims. (Cl. 88—28)

The invention relates to picture projection apparatus, and is especially adaptable to apparatus of the nature in which the pictures are projected consecutively from films of the so-called filmstrip type. In the present embodiment, the projector apparatus may be such as to afford either single or dual projection, in the latter case a pair of filmstrips of like subject matter being passed through the apparatus intermittently with dissolve presentation, for example, in the manner set forth in my copending application, Serial No. 651,910, now Patent No. 2,503,277, dated April 11, 1950. In systems of this nature, it is particularly desirable to have the respective optical systems or, in case of a single projection system, the single optical system maintained permanently fixed with respect to the film-advancing mechanism. That is to say, the lens barrel of an optical system should not swing open along with a "gate" when threading the film in the apparatus, as is the customary procedure.

It is an object of the invention so to construct a picture projection apparatus for loading therein its film cartridge that the same may be introduced into the projector without in any manner disturbing the projecting lens in relation to its optical system or systems. In other words, the lens barrel remains permanently in line with the source of illumination including the conventional reflector and condenser lens.

Another object of the invention is to provide a slide member or carrier for mounting the film cartridge, the slide member affording a receptacle designed to retain loosely the coiled roll of film which will be guided into said slide member and by it to its advancing sprocket for threading in the projector.

Still another object of the invention is to modify the customary projector apparatus in such a manner that the slide member when inserted will present the film's leader end to an advancing sprocket for ready manual application then of the strip over the teeth of said sprocket.

A further object of the invention is to provide for projection of various sizes of filmstrips by the same projector through substitution of appropriate slide members.

The invention has for an object, also, to provide suitable framing means for the introduced film strip after the latter has been engaged with its advancing or feed sprocket.

In carrying out the invention, contrary to the conventional swinging gate mechanism design for a projector, which is integral with the projector frame and must be swung open to receive the film, the film roll or cartridge is arranged to be mounted in the projector through the medium of an independent and removable slide member or carrier for said film roll or cartridge, the carrier having a sliding fit in the projector frame. To this end, a coiled roll of film is first loaded externally of the projector into a suitable receptacle of its slide member or carrier which is then manually slid into the projector frame through a transverse elongated passageway provided therein and to an extent sufficient to position the leader end of the film in juxtaposition to the advancing or feed sprocket therefor.

By means of suitable framing mechanism, after threading the film over said sprocket, the film may be duly registered as to its frames with respect to registering projection apertures provided in the slide member and connected to the take-up spool of the projector. When the roll of film in the slide member becomes exhausted, the latter is to be manually withdrawn from the projector for reloading by placing a new roll in the receptacle of the slide member, and relocating the latter in the projector, as is hereinafter more fully set forth. By providing a plurality of these slidable carrier members, all of like size and external configuration but with appropriate internal dimensions, various sizes of filmstrips, for example, 8 mm., 16 mm., and 35 mm., may be utilized in the same projector by correspondingly accommodating the receptacle and registering apertures of the respective carriers thereto, as well as making provision for the proper sprocket for use therewith, for example a reduction type of sprocket.

The nature of the invention, however, will best be understood when described in connection with the accompanying drawings, in which:

Fig. 1 is a fragmentary view in isometric projection illustrating the novel combination of projector and film-cartridge slide member in process of being inserted; and shows also the framing means for registering film supplied by the slide member.

Fig. 2 is a fragmentary side elevation of projector and slide member, with the latter fully introduced.

Fig. 3 is a view in isometric projection of the film-cartridge slide member, and Fig. 4 is a vertical section therethrough.

Fig. 5 is a view of the slide member similar to Fig. 3, but with the door element thereof swung into open position.

Fig. 6 is a fragmentary front elevation and partial longitudinal section of the film-advancing sprocket with drive mechanism and framing means.

Fig. 7 is a vertical section through the framing head or knob of the framing means, taken on the line 7—7, Fig. 6, and looking in the direction of the arrows.

Referring to the drawings, 10 designates a portion of the projector frame, more particularly at the forward end of said projector and which carries the lens barrel 11 with lens 12. In accordance with the invention, the lens barrel is rigidly mounted on the frame portion 10 and does not swing outwardly in the convention manner when a film is to be threaded in the projector, the customary gate used for this purpose also being dispensed with in the novel combination of projector and film-cartridge slide member film-threading arrangement.

The top 13 of the frame 10 is, in accordance with the invention, provided with a guide opening or passageway 14 which extends along the sides and is designed to receive a novel film-cartridge-supporting member 15 slidable through the passageway in threading a film in the projector and to be held in a predetermined relationship with respect to the frame and the optical system represented in part by the lens 12. To this end, a spring clip 16 secured to the top 13 is designed to engage in a catch 17 of the slide member 15.

The slide member is designed in a novel manner not only to pass freely through the passageway 14, but to permit of mounting the leader end of the filmstrip therein. Thus, reference being had more particularly to Figs. 3 to 5, inclusive, the slide member is generally of rectangular conformation with a film-cartridge-retaining element or receptacle 19 protruding from the upper portion of the front wall 20 of the member. This element is of generally semi-cylindrical conformation and of a width to accommodate readily a film cartridge 21 in the nature of a more or less loosely coiled strip of film, which coil may be placed therein and the leader end of the film passed through a slot 20' in the front wall 20. It is then brought over a recessed portion 23 of the inner face of the member 15 and fitted into a guideway 24 thereof, portion 23 being provided with an aperture 25 corresponding to a frame of the film. A door 26 is hinged along one side of the recessed portion and is designed to close over the inserted film portion so that the slide member as a unit may be inserted into the frame passageway 14 with the leader end of the film firmly held in position.

An aperture 27 is provided in the door 26 registering with the aperture 25 when the door is closed over the film; and an aperture pressure plate 28 is attached to the inner face of the door to insure the film being held firmly in place in the guideway of the slide member. It is preferred, also, to provide an opening or pocket 29 in the door extending from the bottom edge thereof upwardly to accommodate a turned-back portion of the leader end of the film when inserting the member, thus making the film readily available for further threading over the feed sprocket 30, idler 31 and eventually over the take-up 32.

A film guide plate 35 may be provided on the frame for juxtaposition to the inner end of the slide member when the latter is inserted, said plate being hingedly secured and also spring-urged outwardly toward the feed sprocket 30, with a tongue portion 36 designed to fit between the two toothed ends. As the slide member is inserted into the projector, the lower edge of the member encounters the obliquely presented plate which gently pushes the film leader end out over the sprocket. When the slide member is fully inserted, however, plate 36 is pushed inwardly thereby and is in position, under its spring pressure, to assist in holding the slide member firmly in the projector.

For framing the film when threaded over sprocket 30 after insertion of the slide member, the shaft 37 of the sprocket may be extended beyond the frame portion 10 to terminate in an outer shell or head 38 provided with an inturned flange 39. Over the shaft 37 and externally of the frame portion 10 is mounted a sleeve 40 within which the shaft 37 fits more or less snugly, said sleeve terminating at its outer end in a disk-like element 41 which is fitted within the flange 39. Provision is made whereby the element 41 and with it sleeve 40 may be united with the head 38, for example, through the medium of a thumbscrew 42 threaded through the flange and adapted to bear upon the periphery of the disk-like element. When this is effected, the sleeve and shaft will turn togther and rotation for advance of the sprocket 30 may be imparted thereto from a drive shaft 43 through a pair of bevel gears 44, one of which is fixed to the sleeve 40. When it is desired, however, to frame a film over the sprocket, the connection between the head or framing knob 38 and the disk-like element 41 is temporarily interrupted, it being understood that rotation has ceased, by screwing the thumbscrew 42, whereby by rotating manually rotatable head 38 in the required direction, the sprocket 30 will follow until the film has been drawn to the desired frame location. For projection thereafter, screw 42 is again tightened to clutch the sleeve and shaft.

I claim:

1. In projector apparatus: a film-cartridge slide member for film loading of the projector apparatus, comprising a guide plate recessed upwardly from the bottom edge along the rear face, the recessed portion affording a longitudinal passageway; an open-top container for reception of a coil of film, projecting outwardly at the top of the front face of the slide member and having an opening communicating with the passageway; a door hinged along a side of the recessed rear portion to close over the latter portion for retaining film strip passing through said passageway from the coil reception portion, the door and recessed portion each being provided with an aperture, said apertures registering when said door is closed in locating the film strip between the door and recessed portion, and said slide member with strip when mounted in a guideway of the frame of the projector apparatus having said apertures located in the optical axis of the latter, and the door at the bottom edge being recessed upwardly therefrom over a portion of its outer face to accommodate temporarily an upturned leader portion of the film strip, bent back upon itself, when introducing the slide member into the projector apparatus.

2. The combination with film projector apparatus including a housing having a longitudinal guide passageway therethrough, and a fixedly mounted projection lens extending from the front of said housing, said front of the housing being apertured in the optical axis of the lens, together with an advancing sprocket rotatably mounted in the housing for advancing the film; of a removable film-roll slide member mounted in the guide passageway and comprising a guide plate with door each being provided with aperture, the door being hinged to the guide plate to retain film movably therebetween and said apertures, when the door is closed and the slide member inserted in the guide passageway, registering with each other in the optical axis of the lens; a film-roll container element supported by the slide member to supply film strip from a roll therein and between the guide plate and door, the bottom of the slide member being juxtaposed to the film-advancing sprocket to present said free end of the film strip thereto; means located on the housing to cooperate with the slide member to hold the latter to the former in a predetermined position to insure the aforesaid registry; a film guide plate hinged to the projector apparatus housing and resiliently directed obliquely into the path of a projecting free end of the film strip for guiding said end beyond the bottom of the slide member over the film-advancing sprocket of the projector, and the said slide member when fully inserted engaging the film guide plate to push the same in a direction substantially normal thereto and out of the path of film strip passing through the inserted slide member.

3. The combination claimed in claim 2, wherein the film guide plate is outwardly directed toward the film feed sprocket and has a tongue adapted to extend between the toothed elements of the sprocket.

ARTHUR E. KROWS.

REFERENCES CITED

The following references are of record in the file of this patent:

UNITED STATES PATENTS

| Number | Name | Date |
| --- | --- | --- |
| 790,123 | Hall | May 16, 1905 |
| 1,174,208 | Walsh | Mar. 7, 1916 |
| 1,704,814 | Wellman | Mar. 12, 1929 |
| 1,711,977 | Underwood | May 7, 1929 |
| 1,803,313 | Bornmann | May 5, 1931 |
| 1,939,561 | Martin | Dec. 12, 1933 |
| 2,168,941 | Marks | Aug. 8, 1939 |
| 2,174,660 | Hirsch | Oct. 3, 1939 |
| 2,199,305 | Dewey | Apr. 30, 1940 |
| 2,231,743 | Young et al. | Feb. 11, 1941 |
| 2,257,444 | Abadjieff | Sept. 30, 1941 |
| 2,438,710 | Larson | Mar. 30, 1948 |
| 2,485,709 | Davock | Oct. 25, 1949 |

FOREIGN PATENTS

| Number | Country | Date |
| --- | --- | --- |
| 205,792 | Great Britain | May 1, 1924 |